June 2, 1959  J. J. KOWALIK  2,889,153
SIDE DRAFT CONTROL WHEEL FOR SIDE DELIVERY RAKES
Filed Sept. 24, 1956  3 Sheets-Sheet 1

INVENTOR.
John J. Kowalik
BY Paul O. Pippel
ATTY.

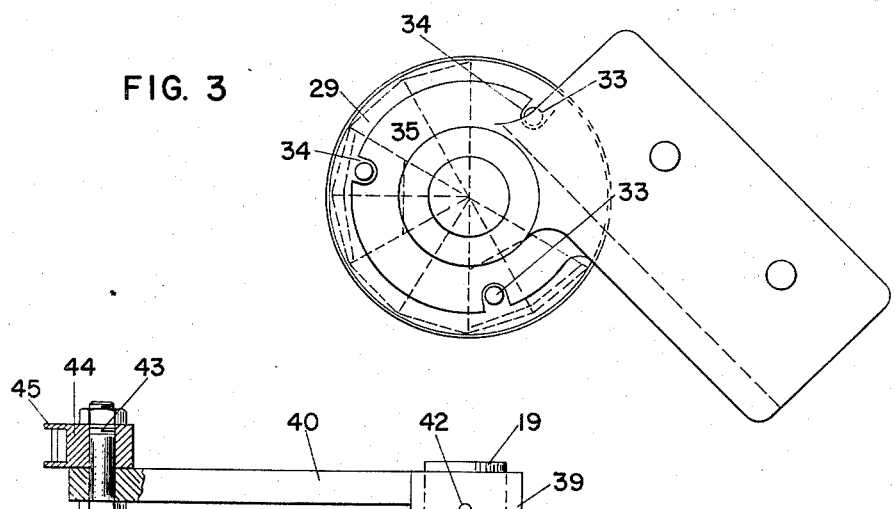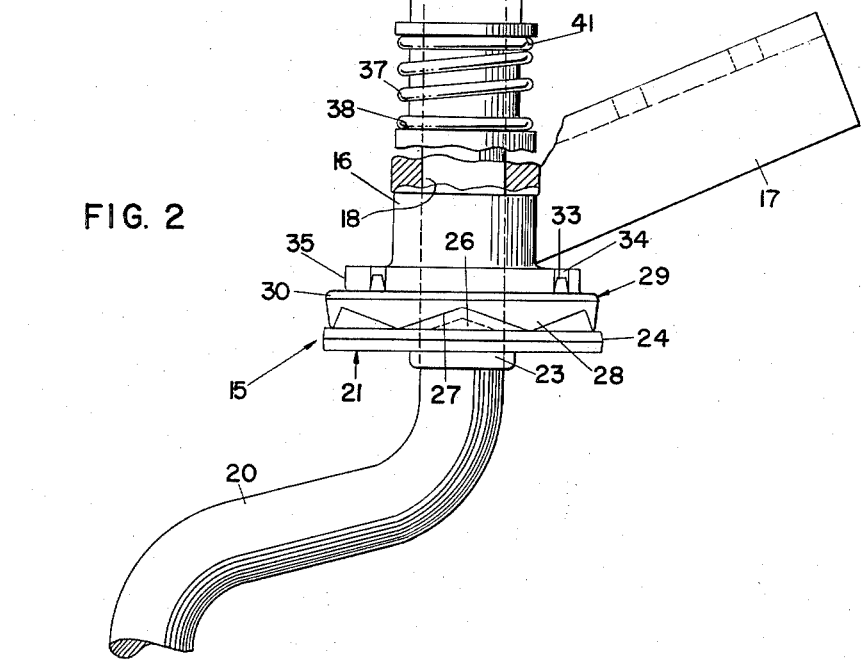

June 2, 1959
J. J. KOWALIK
2,889,153
SIDE DRAFT CONTROL WHEEL FOR SIDE DELIVERY RAKES
Filed Sept. 24, 1956
3 Sheets-Sheet 3
FIG. 4
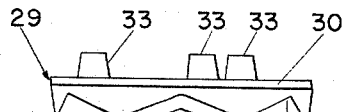
FIG. 5
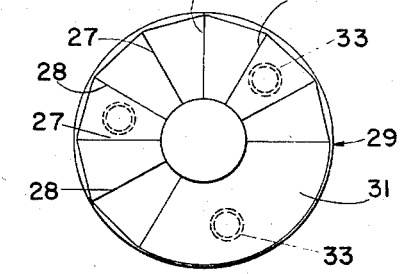
FIG. 6
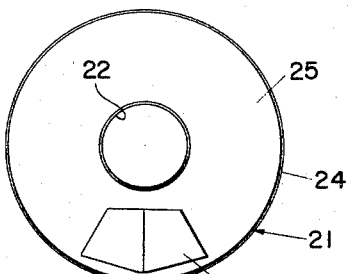
FIG. 7
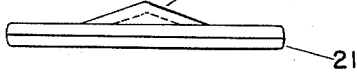
FIG. 9
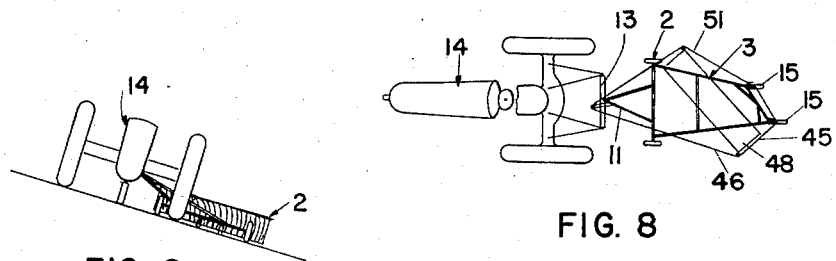
FIG. 8
INVENTOR.
John J. Kowalik
BY Paul O. Pippel
ATTY.

United States Patent Office 2,889,153
Patented June 2, 1959

2,889,153

SIDE DRAFT CONTROL WHEEL FOR SIDE DELIVERY RAKES

John J. Kowalik, Chicago, Ill., assignor to International Harvester Company, a corporation of New Jersey Application September 24, 1956, Serial No. 611,697

6 Claims. (Cl. 280—93)

This invention relates to side delivery rakes and more particularly to a releasable control for the caster wheels in order to counteract side drafts imposed upon the rake.

In the implement under consideration the rake is of the type which is adapted to be drawn by a tractor and pivotally connected thereto on a vertical axis. It has been found that in hillside operation the rake tends to drift downwardly with respect to the tractor when the rear caster wheels of the rake are accommodated free rotation.

It is an object of the invention to provide a simple and effective caster wheel control for such side delivery rake and wherein the parts are so arranged that they may be positioned in cammed arrangement to resist free rotation of the caster wheels or may be re-arranged so that the caster wheels are freely rotatable within limits in normal level operation of the rake.

The principal object of the invention is to provide a novel caster wheel control wherein the caster wheel standard and the support frame work of the rake are provided with inter-engaging cammed surfaces occupying a limited sector of the area about the spindle and the remainder of this area being substantially flat faced so that when the cammed portions are displaced circumferentially the caster wheel is accommodated free rotation.

A further object is to provide such a control wherein the caster wheels are accommodated 360° castering.

The foregoing and other important objects and desirable features of the invention will become apparent from the specification and the drawings, wherein:

Figure 2 is a fragmentary side elevational view of the camming mechanism between the frame and the caster wheel spindle with portions broken away and other portions shown in vertical section;

Figure 3 is a plan view of the bearing portion attachable to the rake frame and the cam collar connectible to the caster wheel spindle;

Figure 4 is an edge elevational view of the top cam member;

Figure 5 is a bottom view of the cam member shown in Figure 4;

Figure 6 is a plan view of the cam member which is connected to the caster wheel spindle;

Figure 7 is an edge view of the cam member shown in Figure 6, and

Figures 8 and 9 are diagrammatic views illustrating the tractor and side delivery rake in connected relationship, Figure 8 being a plan view and Figure 9 being a front view showing the tractor operating on the hillside with the rake trailing therebehind and displaced laterally from the tractor and downwardly therefrom.

Figure 1:
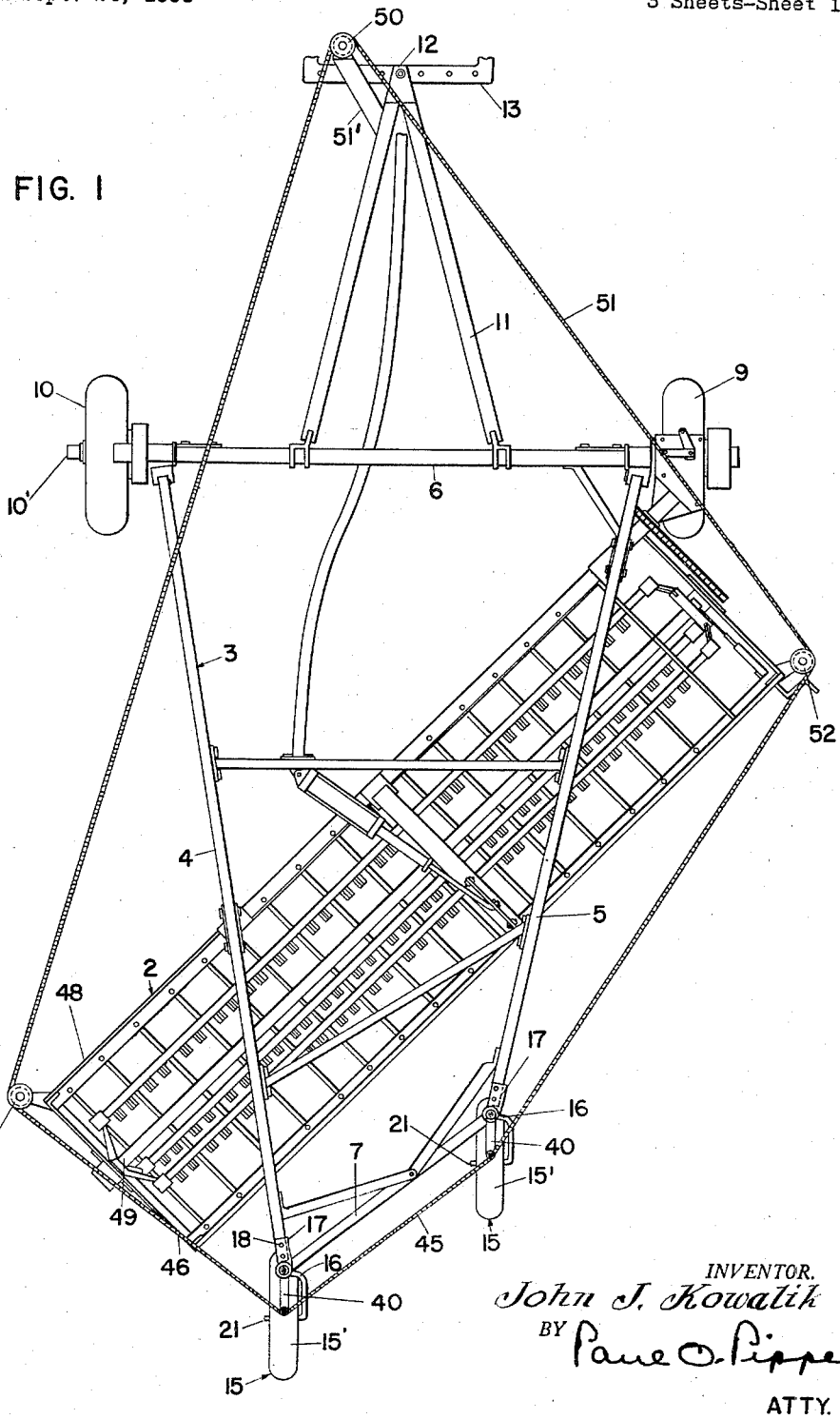
Figure 1 is a plan view of a rake incorporating the invention.

Describing the invention in detail, the side delivery rake 2 is generally of conventional design and of the type shown and described in U. S. Patent #2,518,389 and comprises a frame structure or implement support structure 3 including a pair of fore and aft extending beam members 4 and 5 which at their front and rear ends are interconnected by means of cross-members 6 and 7 and supported at their forward ends by ground-engaging means comprising front wheel means 9 and 10 on an axle 10'. The front member 6 is pivotally connected to a forwardly projecting hitch 11 which at its forward end is pivoted as at 12 on a substatially vertical axis by means of a connecting pin which is pivoted to the drawbar 13 of the draft vehicle or tractor generally designated 14.

The rear end of the frame is supported by identical caster wheel assemblies 15 each of which comprises a bearing member 16 of tubular form connected to a mounting bracket 17 which is suitably attached as by rivets 18 to the rear end of the related main beam member 4 or 5. The tubular portion of the bearing member 16 extends vertically and is provided with a substantially vertical bore 18 through which extends a vertical portion 19 of a caster wheel standard or stem 20 which at its lower end is provided with a substantially horizontal axle portion 21 on which is rotatably mounted the caster wheel 15'.

It will be seen from a consideration of Figure 2 that the shank portion 19 of the spindle 20 is provided with a horizontal plate-like member generally indicated 21 which has a central bore or aperture 22 admitting the spindle portion 19 of the standard 20 of the caster wheel and fixedly weld-connected as at 23 (Figure 2) so that for all intents and purposes the member 21 and the standard 20 are an integral unit and the member 21 may be considered as part of the standard 20. The collar 21 comprises a substantially flat plate portion 24 with an upper annular substantially flat generally horizontal bearing surface 25 which is interrupted in one sector thereof with an upstanding tooth 26 which is adapted to inter-fit into any of a series of concavities 27 developed between a plurality of circumferentially spaced depending teeth 28 of an upper plate-like cam member 29 which has a substantially annular plate-like portion 30, the bottom of which is provided in the sector not occupied by the teeth 28 with an annular substantially flat, generally horizontal surface 31 (Figure 5) against which the tooth 26 of the bottom plate member is adapted to bear and ride on while simultaneously the teeth 27 of the top plate seat on the surface 25. In this position the teeth 26, 27 are misaligned axially of the caster wheel spindle portion 19 and the member 21 has unrestricted rotary or free castering movement relative to the member 29 within the limits of the angular extent of the surface 31 circumferentially of the member 29.

It will be noted that the member 29 is provided with a plurality of upstanding lugs 33 which are spaced 120° apart and these lugs project into similarly spaced slots 34 in the bottom out-turned flange portion 35 of the bearing member 16. It will be noted that the member 29 is thus rotatable to three independent positions circumferentially of the bearing member 16 and in one position the teeth 27 and 26 are circumferentially displaced so that they ride respectively on the surfaces 25 and 31 of the upper and lower cam members and this position is preferably so located that the caster wheel rides generally parallel to the line of draft of the unit without restriction and is adapted for use for operating on normal level ground. The top member 29 has a second position whereat the caster wheel is disposed to run generally parallel to the line of draft, however, with tooth 26 engaged with a pair of the teeth 27. It will thus be understood that the wheels 15 may be positioned to rotate in parallel relationship to the line of draft with either restrictive castering or with free-castering dependent upon the position of the top member 29. It will be noted from a consideration of Figure 2 that the members 21, 29 and the members 29 and 16 are maintained in releasably interengaged relationship by means of a compression spring 37 which is sleeved over the upper end of the spindle portion 19 and compressed between the upper edge of the bearing 16 as at 38 and the bottom edge of the hub portion 39 of a crank member 40 as at 41, the crank member 40 being pinned or connected as at 42 to the spindle 19 and extending rearwardly therefrom and having a pivotal connection by means of a nut and bolt assembly 43 (Figure 2) to a connector 44 which connects with a cable or control element 45 extending between the arms 40 of the two caster wheel assemblies 15 and interconnecting the same so that the two operate in unison. The endless member 45 is herein shown preferably in the form of a chain which has a left length 46 extending laterally outwardly and leftwardly of the left caster wheel and trained about a sheave 47 which is mounted by a bracket to the raking basket frame 48 which supports the raking reel 49. The left length 46 then proceeds forwardly of the rake and around a sheave or support 50 which is carried on a standard 51' from the hitch or draft frame 11 and connects with the rightward length 51 which is trained about a sheave 52 mounted in a bracket on the rake frame 48 at a point rightwardly of the right caster wheel assembly 15. It will be understood that the support assembly 50—51 at the forward end of the rake for the endless control member 45 is positioned within easy reach of the operator such that the operator merely pulls on the length 46 or on the length 51 in order to turn the caster wheels left or right respectively.

It will be understood that with the caster wheel control means having the cam members on the bearing and on the spindle engaged, the operator may correct for a side draft when operating on a hill as seen in Figure 9 in order to have the rake track directly behind the tractor by pulling the leftward length 46 of the control member whereby the wheels 15', 15' are turned and angled to the right with respect to the line of draft of the implement. This of course causes the rake to climb up the hill continuously and thus counteracts and corrects for the side draft imposed upon the rake tending to slip the rake downwardly on the hill. It will be understood that the arrangement of the two cam areas of the two cam members and the flat surface areas adapts the same to be disposed in the most effective arrangement for the specific conditions encountered and the increments of adjustment may be infinitely varied. It will be readily appreciated that the positioning of the control member 45 within easy access to the operator provides for ready adjustment by the operator to any condition he may encounter while on-the-go. It will also be noted that in order to adjust the position of the top cam member all that is required is to compress the spring 37 whereby the top member 29 is accommodated withdrawal of its lugs 33 from the slots 34 of the bearing member and is permitted to be rotated to any of its other positions.

It will be understood that the embodiment shown is merely by way of illustration and not limitation and that the scope of the invention is to be measured solely by the appended claims.

What is claimed is:

1. An implement comprising a frame, wheel means for supporting the forward end of the frame, draft means connected to the frame and adapted for pivotal connection to an associated draft vehicle on a generally vertical axis, a caster wheel for supporting the rear of said frame and having a spindle extending upwardly therefrom, a bearing assembly on the frame in which said spindle is rotatable about a vertical axis, complementary cam means on said bearing assembly and said spindle disposed in engaged relationship, said cam means being so arranged that said caster wheel may be held to run oblique to the line of draft of said vehicle in a direction in opposition to side draft forces tending to move said implement in laterally offset relation to the draft vehicle, and flat bearing surfaces on said bearing assembly and said spindle extending transversely of the axis of the spindle and spaced circumferentially of said cam means, said cam means of said bearing assembly adapted to engage said surface on the spindle and said cam means on the spindle adapted to engage said surface on said bearing assembly to accommodate limited free castering of said caster wheel, and said bearing assembly comprising a part including said cam means and said part positionable in a plurality of locations about said spindle for changing the location of the free castering and interlocked positions of the caster wheel with respect to the line of draft of the implement.

2. An implement comprising a frame, wheel means for supporting the forward end of the frame, draft means connected to the frame and adapted for pivotal connection to an associated draft vehicle on a generally vertical axis, a caster wheel for supporting the rear of said frame and having a spindle extending upwardly therefrom, a bearing assembly on the frame in which said spindle is rotatable about a vertical axis, complementary cam surfaces on said bearing assembly and said spindle disposed in engaged relationship, said surfaces being disposed to hold said caster wheel to run oblique to the line of draft of said vehicle in a direction in opposition to side draft forces tending to move said implement in laterally offset relation to the draft vehicle, and spring means compressed between said spindle and said bearing assembly and urging the same in directions tightly engaging said cam surfaces, and said bearing assembly comprising a member including said cam surfaces, and said member positionable in a plurality of locations about said spindle for relocating said cam surfaces thereon to reposition said caster wheel.

3. An implement comprising a frame, draft means connected to the frame and adapted for pivotal connection to an associated draft vehicle on a generally vertical axis, a caster wheel for supporting the rear of said frame and having a spindle extending upwardly therefrom, a bearing assembly connected to the frame in which said spindle is rotatable about a vertical axis, complementary vertically opposed cam surfaces on said bearing assembly and said spindle disposed in mutually engaged relationship, said surfaces being disposed to releasably hold said caster wheel to run oblique to the line of draft of said vehicle in a direction in opposition to side draft forces tending to move said implement in laterally offset relation to the draft vehicle, spring means compressed between said spindle and said bearing assembly and urging the same in directions tightly engaging said cam surfaces, means for angularly positioning said caster wheel by an operator from the tractor comprising an arm connected to said spindle and extending angularly therefrom, an endless flexible member connected to the outer end of said arm, guide means for said member carried on said frame and including a pair of guide elements spaced at opposite sides of said spindle transversely of said line of draft and supporting said member, said member extending beyond the forward end of said implement frame, and means movably supporting said member within reach of an operator on the tractor, said cam surfaces having a plurality of positions and readily releasable by movement of said arm while the implement is on-the-go.

4. An implement comprising a frame, wheel means for supporting the forward end of the frame, draft means connected to the forward end of said frame, a bearing member connected to the rear end of said frame, a caster wheel having a spindle extending upwardly and rotatable in said bearing member, cooperative force releasable cam means associated with said bearing member and said spindle for positioning said spindle with the caster wheel in circumferentially displaced positions to hold the caster wheel in selected angular positions as respects to the line of draft of the vehicle, said cam means associated with said spindle comprising a generally horizontal plate fixed to said spindle and having an upper generally flat surface and a tooth integral with said plate extending upwardly from said surface, said cam means associated with said bearing comprising a generally horizontal plate element disposed beneath said bearing and adjustably interlocked therewith for rotative displacement about said spindle in several positions and having a bottom substantially flat surface having a sector with a plurality of teeth depending therefrom, said plate element having a first position with said teeth engaging said tooth on said plate to prevent free castering of said caster wheel and said plate element having a second position engaging its flat surfaces with said tooth and its teeth engaging said flat surface on said plate to accommodate limited free castering of said caster wheel in the normal running position thereof.

5. An implement comprising a frame, means at one end of said frame for supporting the latter upon the ground, means on said frame at the other end of said frame for connection to associated propelling means, said supporting means including a caster wheel having an upwardly extending spindle, means mounting said spindle on the frame for rotation on a substantially vertical axis and including a bearing assembly, interlocking means for holding the spindle relative to the frame constructed and arranged to position said spindle in angularly displaced increments about said vertical axis to position said wheel to run at selected angles to the direction of travel of the implement whereby the side draft of the implement can be governed and comprising a pair of opposed surfaces on said spindle and said bearing assembly extending transversely of the spindle, and releasably interengaged cam means on said spindle and bearing member on said surfaces and including a cam free sector for accommodating limited free castering of said caster wheel.

6. The invention according to claim 5 and further characterized in that said interlocking means comprises a movable portion releasably connected to said bearing assembly and rotative relative to said assembly about said vertical axis to several positions, said movable portion including said surface and cam means and having one position axially registering said cam means thereon with said cam means on said surface on the spindle for restricting free castering of said wheel, and said movable portion having another position disposing said cam means thereon in axial registry with said cam free sector of the surface on said spindle and the cam means on the latter with a cam free sector of the surface on the former whereby said wheel is accommodated limited free castering.

References Cited in the file of this patent

UNITED STATES PATENTS

| | | |
|---|---|---|
| 1,277,542 | Cameron | Sept. 3, 1918 |
| 1,734,393 | Mowry | Nov. 5, 1929 |
| 1,913,034 | Lindgren et al. | June 6, 1933 |
| 2,235,041 | Ronning | Mar. 18, 1941 |
| 2,255,288 | Jones et al. | Sept. 9, 1941 |
| 2,329,823 | Camburn | Sept. 21, 1943 |
| 2,421,464 | Reiner | June 3, 1947 |
| 2,505,852 | Budnick | May 2, 1950 |
| 2,560,726 | Jones et al. | July 17, 1951 |

FOREIGN PATENTS

| | | |
|---|---|---|
| 680,537 | Great Britain | Oct. 8, 1952 |